(12) United States Patent
Mizukami (10) Patent No.: US 7,729,455 B2
(45) Date of Patent: Jun. 1, 2010

(54) PSK RECEIVER, PSK DEMODULATING CIRCUIT, COMMUNICATION APPARATUS, AND PSK RECEIVING METHOD

(75) Inventor: Hiromitsu Mizukami, Suwa (JP)

(73) Assignee: Seiko Epson Corporation (JP)

( * ) Notice: Subject to any disclaimer, the term of this patent is extended or adjusted under 35 U.S.C. 154(b) by 836 days.

(21) Appl. No.: 11/562,030

(22) Filed: Nov. 21, 2006

(65) Prior Publication Data

US 2007/0121762 A1    May 31, 2007

(30) Foreign Application Priority Data

Nov. 25, 2005  (JP)  ............................. 2005-339776
Aug. 29, 2006  (JP)  ............................. 2006-231669

(51) Int. Cl.
   *H04L 27/22* (2006.01)
(52) U.S. Cl. ........................ 375/329; 375/316; 375/324
(58) Field of Classification Search ................ 375/324, 375/329
   See application file for complete search history.

(56) References Cited

U.S. PATENT DOCUMENTS 5,799,043 A * 8/1998 Chang et al. ................ 375/286

FOREIGN PATENT DOCUMENTS

| JP | 57-125557 | 8/1982 |
| JP | H09-116584 | 5/1997 |
| JP | 2001-24726 | 1/2001 |

OTHER PUBLICATIONS

Wu P. H.: "The Optimal BPSK Demodulator With A 1-Bit A/D Font-End" Milcom '98. IEEE Military Communications Conference Proceedings. Boston, MA, Oct. 19-21, 1998, IEEE Military Communications Conference, New York, NY: IEEE, US, vol. 3, Oct. 19, 1998, pp. 730-735, XP000828823 (figure 1).

Figucia R. J.: "Advanced SCAMP's Demodulator Design For Performing Envelope Recovery From Hardlimited Samples" Military Communciations Conference, 1992, Milcom '92, Conference Record, Communications—Fusing Command, Control and Intelligence., IEEE San Diego, CA, USA Oct. 11-14, 1992, New York, NY, USA, IEEE, US, Oct. 11, 1992, pp. 385-389, XP010060779 (figure 1).

Chuck Brown et al.: "Digital Ultrafast Carrier Recovery For Interactive Transmission Systems" IEEE Transactions on Consumer Electronics, vol. 42, No. 1, Feb. 1996 pp. 132-139, XP011008208 (p. 136, left-hand column, paragraph 1).

* cited by examiner

*Primary Examiner*—David C Payne
*Assistant Examiner*—Leon Flores
(74) *Attorney, Agent, or Firm*—Harness, Dickey & Pierce, P.L.C.

(57) ABSTRACT

A phase-shift keying (PSK) receiver includes a carrier wave generator generating a carrier wave, an extracting unit extracting an in-phase component I and a quadrature component Q from a received signal on the basis of the carrier wave and the received signal, a comparator comparing the in-phase component I and the quadrature component Q extracted from the received signal to a predetermined threshold values respectively and acquiring 1-bit digital signals corresponding to the in-phase component I and the quadrature component Q respectively; and a BPSK demodulator demodulating the received signal using a binary phase-shift keying (BPSK) scheme on the basis of positional relationship on I-Q constellation between the 1-bit digital signals corresponding to the in-phase component I and the quadrature component Q acquired by the comparator.

5 Claims, 9 Drawing Sheets

| I | Q | DOMAIN | PHASE POINT |
|---|---|---|---|
| 1 | 1 | (R1) | $\pi/4$ |
|   |   | (R3) | $\pi/2$ |
|   |   | (R4) | 0 |
| 0 | 1 | (R2) | $3\pi/4$ |
|   |   | (R3) | $\pi/2$ |
|   |   | (R4) | $\pi$ |
| 0 | 0 | (R1) | $5\pi/4$ |
|   |   | (R3) | $3\pi/2$ |
|   |   | (R4) | $\pi$ |
| 1 | 0 | (R2) | $7\pi/4$ |
|   |   | (R3) | $3\pi/2$ |
|   |   | (R4) | 0 |

FIG. 5

| DOMAIN | QUADRANT | DATA |
|---|---|---|
| R1 | 1 | DATA I |
| R1 | 3 | REVERSE DATA I |
| R2 | 2 | DATA Q |
| R2 | 4 | REVERSE DATA Q |
| R3 | 1 OR 2 | DATA Q |
| R3 | 3 OR 4 | REVERSE DATA Q |
| R4 | 1 OR 4 | DATA I |
| R4 | 2 OR 3 | REVERSE DATA I |

PSK RECEIVER, PSK DEMODULATING CIRCUIT, COMMUNICATION APPARATUS, AND PSK RECEIVING METHOD

BACKGROUND

1. Technical Field

The present invention relates to a phase-shift keying (PSK) receiver, a PSK demodulating circuit, a communication apparatus, and a PSK receiving method, and more particularly, to a phase-shift keying (PSK) receiver, a PSK demodulating circuit, a communication apparatus, and a PSK receiving method, suitable for application to a technology in which a demodulation operation is performed on the basis of an in-phase component I and a quadrature component Q which are converted into a 1-bit digital signal.

2. Related Art

As a semi-synchronous detection method in the PSK demodulation, there are a method in which a carrier wave is synchronized on the basis of the received in-phase component I and the quadrature component Q (JP-A-2001-024726) and a method in which a carrier wave is synchronized on the basis of a phase θ obtained by applying the following formula (1) to the received in-phase component I and the quadrature component Q (JP-A-9-116584).

$$\theta = \tan^{-1}(I/Q) \tag{1}$$

However, according to the method described in JP-A-2001-024726, since the carrier wave is synchronized on the basis of the in-phase component I and the quadrature component Q, it is necessary to multiply complex values in order to compensate the phase of the received signals. The complex multiplication requires four multipliers, which increases the size of the circuit. In addition, according to the method described in JP-A-9-116584, since a phase θ is obtained on the basis of the in-phase component I and the quadrature component Q, it is necessary to perform the calculation in formula (1). The calculation requires a large-capacity ROM, which increases the size of the circuit.

Moreover, in the described methods, the phase compensation operation requires a multi-bit AD converter, which accelerates the increase in the size of the circuit.

SUMMARY

An advantage of some aspects of the invention is that it is to provide a phase-shift keying (PSK) receiver, a PSK demodulating circuit, a communication apparatus, and a PSK receiving method, capable of demodulating a phase modulated signal without increasing the size of the circuit.

According to an aspect of the invention, there is provided a phase-shift keying (PSK) receiver including a carrier wave generator generating a carrier wave, an extracting unit extracting an in-phase component I and a quadrature component Q from a received signal on the basis of the carrier wave and the received signal, a comparator comparing the in-phase component I and the quadrature component Q extracted from the received signal to a predetermined threshold values respectively and acquiring 1-bit digital signals corresponding to the in-phase component I and the quadrature component Q respectively, and a BPSK demodulator demodulating the received signal using a binary phase-shift keying (BPSK) scheme on the basis of positional relationship on I-Q constellation between the 1-bit digital signals corresponding to the in-phase component I and the quadrature component Q acquired by the comparator.

In the PSK receiver, since the received signal using a binary phase-shift keying (BPSK) scheme is demodulated on the basis of positional relation on I-Q constellation between the 1-bit digital signals corresponding to the in-phase component I and the quadrature component Q, demodulation error caused by phase rotation can be reduced. In addition, since it is not necessary to bothersome calculate in order to obtain a phase θ on the basis of the in-phase component I and the quadrature component of the received signal, it is possible to demodulate a phase modulated signal. Consequently, since a multi-bit AD converter or a large-capacity ROM is not necessary, it is possible not to increase the size of the circuit.

In the PSK receiver, the BPSK demodulator may demodulate the received signal on the basis of one of the in-phase component I and the quadrature component Q, on basis of positional relation on the I-Q constellation of the 1-bit digital signals corresponding to the in-phase component I and the quadrature component Q.

In the PSK receiver, since the received signal is demodulated on the basis of either of the in-phase component I or the quadrature component Q, on the basis of positional relation on the I-Q constellation of the 1-bit digital signals corresponding to the in-phase component I or the quadrature component Q respectively, it is possible to reduce the demodulation error caused by phase rotation. That is because the received signal can be demodulated on the basis of the component where the sign is not reversed, even though the probability of reversing the sign of the in-phase component I or the quadrature component Q that is converted into the 1-bit digital signal is high.

In the PSK, the BPSK demodulator may demodulate the received signal only on the in-phase component I when the phase point defined as the 1-bit digital signals corresponding to the in-phase component I and the quadrature component Q respectively are within predetermined range from the I axis, and the BPSK demodulator demodulates the received signal only on the in-phase component Q when the phase point is within predetermined phase range from the Q axis.

In the PSK receiver, when a phase point where the received signal is specified as the in-phase component I or the quadrature component Q approaches the I axis, and probability of reversing the sign of the quadrature component Q converted into the 1-bit digital signals is high, it is possible to demodulate the received signal without referring to the quadrature Q. At the same time, since the phase point defined by the in-phase component I or the quadrature component Q approaches the Q axis, when probability of reversing the sign of the in-phase component I that is converted into the 1-bit digital signals is high, it is possible to demodulate the received signal without referring to the in-phase component I. Accordingly, it is possible to reduce demodulation error caused by phase rotation.

In the PSK receiver, the BPSK demodulator may have a quadrant determining circuit that determines which quadrant phase points defined as the 1-bit digital signals corresponding to the in-phase component I and the quadrature component Q respectively belong to on I-Q constellation, a rotating direction determining circuit that determines rotating direction on I-Q constellation defined as the 1-bit digital signal respectively, an IQ determining circuit that compensates the in-phase component I and the quadrature component Q by deciding whether the in-phase component I and the quadrature component Q included in the received signal are right or not on the basis of the result of the determining circuit and the rotation direction determining circuit, a state determining circuit that determines position on the I-Q constellation of the phase points, and a determining circuit that demodulates the received signal on the basis of the result that are compensated by the I-Q determining circuit and are determined by the state determining circuit.

In the PSK receiver, the in-phase component I and the quadrature component Q are converted into the 1-bit digital signals respectively. Accordingly, for example, even though any phase point on the first quadrant is defined as the point on 45°, it is possible to define which phase point the signal before quantization corresponds to. Therefore, in order to demodulate the received signal, it is unnecessary to perform the bothersome calculation to obtain phase θ on the basis of the in-phase component I and the quadrature component Q of the received signal. Accordingly, it is possible to demodulate the phase modulated signal without increasing the size of the circuit since a multi-bit AD converter or a large-capacity ROM is not required.

In the PSK receiver, the state determining may divide the I-Q constellation into the first domain including a first quadrant and a third quadrant excluding predetermined range from the I and Q axis, on the second domain including the second quadrant and a fourth quadrant excluding predetermined range from the I and Q axis, on the third domain within predetermined range from the I axis, and on the fourth domain within predetermined range from the Q axis, and when the in-phase component I and the quadrature component Q included in the received signal are not matched, the state determining circuit determines that the present domain of the phase points is changed to the next domain according to the rotating direction determined by the rotating direction determining circuit.

In the PSK receiver, since the location of the phase points defined on the basis of the in-phase component I and the quadrature component Q of the received signal that are converted into the 1-bit digital signals are defined on the I-Q constellation, it is unnecessary to compensate the phase to obtain the phase θ on the basis of the in-phase component I and the quadrature component Q of the received signal. Consequently, the size of the circuit is not increased.

In the PSK receiver, the state determining circuit may divide the I-Q constellations into a first domain including a first quadrant and a third quadrant excluding the predetermined range from the I axis and Q axis, on a second domain with a second quadrant and a fourth quadrant excluding the predetermined range from the I axis and Q axis, on a third domain within the predetermined range from the Q axis, and on a fourth domain within the predetermined range from the I axis, and the state determining circuit changes the domain of the phase point to match on the specific quadrant when a phase point of the corresponding 1-bit digital signal determined in the quadrant determining circuit is on the specific quadrant in a series of predetermined times.

In the PSK receiver, since the location of the phase points defined on the basis of the in-phase component I and the quadrature component Q of the received signal that are converted into the 1-bit digital signal respectively is defined on the I-Q constellation, it is unnecessary to compensate the phase to obtain the phase θ on the basis of the in-phase component I and the quadrature component Q of the received signal. Consequently, the size of the circuit is not increased.

In the PSK receiver, a clock synchronization unit may obtain timing signal for restricting sampling timing by the comparator to synchronize with the corresponding in-phase component I or the quadrature component Q, by comparing the selected in-phase component I or the selected quadrature component Q with phase of the reference phase pulse where the phase relation is adjusted with reference clock on the basis of the determination result in the state determining circuit.

In the PSK receiver, the sampling timing by the comparator is restricted to synchronize with the corresponding in-phase component I or the quadrature component Q.

In the PSK receiver, a frequency offset detecting circuit may detect frequency offset of the carrier offset on the basis of time how long it takes the rotating displacement to reach to the predetermined angle corresponding to integer times of 90° when the corresponding phase point rotates on the I-Q constellation with the lapsed time and sets the determining terms to decide where the phase point is on the I-Q constellation on the basis of the frequency offset.

In the PSK receiver, when the corresponding phase point is rotated on the I-Q constellation, the speed of movement of the phase point is measured on the basis of time until the rotation displacement approaches the predetermined integer times of 90°, and then frequency offset is detected (estimated) on the basis of the speed. The state determining circuit sets conditions to determine locations on the I-Q constellation of the corresponding phase point on the basis of the detected frequency offset. Consequently, it is unnecessary to perform bothersome calculation in order to obtain the phase θ from the in-phase component I and the quadrature component Q of the received signal, and the size of the circuit is not increased.

In the PSK receiver, the carrier wave generator may control frequency of the self-made carrier wave on the basis of the corresponding frequency offset detected by the frequency offset detecting circuit.

In the PSK receiver, data regarding amount of the corresponding frequency offset detected by the frequency offset determining circuit my be provided to a carrier wave generator, and the carrier wave generator controls frequency of the self-made carrier wave on the basis of the frequency offset. Since it is possible to gradually reduce the frequency offset of the sending and receiving interval, it is possible to receive with having low BER (bit error rate), without increasing the size of the circuit.

In a PSK demodulating circuit, the PSK demodulating circuit may have a quadrant determining circuit that determines quadrant on the I-Q constellation where the phase point defined by the 1-bit digital signals respectively corresponding to the in-phase component I and the quadrature component Q included in the received signals exists, an rotating direction determining circuit that determines rotating direction of the phase point defined by the in-phase component I and the quadrature component Q included in the received signal, an IQ determining circuit that compensates the in-phase component I and the quadrature component Q by determining whether the in-phase component I and the quadrature component Q included in the received signal are right on the basis of the determination result in the quadrant determining circuit and the rotating direction determining circuit, a state determining circuit that determines position on the I-Q constellation of the phase point defined by the in-phase component I and the quadrature component Q, and a determining circuit that demodulates the transmission signal on the basis of the compensation result in the IQ determining circuit and the determination result in the state determining circuit.

In the PSK demodulating circuit, even though any phase point defined by the 1-bit digital signals respectively corresponding to the in-phase component I and the quadrature component Q is determined as the point on 45° on the first quadrant, it is possible to define which phase point the signal before quantization corresponds to. Therefore, in order to demodulate the received signal, it is unnecessary to perform the aforementioned bothersome calculation to obtain phase θ on the basis of the in-phase component I and the quadrature component Q of the received signal, whereby it is possible to demodulate the phase modulated signal without increasing the size of the circuit.

According to another aspect of the invention, there is provided a PSK receiver, comprising: an quadrant determining circuit that determines a quadrant on an I-Q constellation where a phase point defined by 1-bit digital signals respectively corresponding to an in-phase component I and an quadrature component Q included in a received signal exists; an rotating direction determining circuit that determines rotating direction of the phase point defined by the in-phase component I and the quadrature component Q included in the received signal; an IQ determining circuit that compensates the in-phase component I and the quadrature component Q by determining whether the in-phase component I and the quadrature component Q included in the received signal are right on the basis of the determination result in the quadrant determining circuit and the rotating direction determining circuit; a state determining circuit that determines position on the I-Q constellation of the phase point defined by the in-phase component I and the quadrature component Q; and a determining circuit that demodulates the transmission signal on the basis of the compensation result in the IQ determining circuit and the determination result in the state determining circuit, wherein the state determination circuit divides the I-Q constellation into a first domain including a first quadrant and a third quadrant excluding predetermined range from I axis and Q axis, on a second domain including a second quadrant and a fourth quadrant excluding the predetermined range from the I axis and Q axis, on a third domain including the predetermined range from the Q axis, and on a fourth domain within the predetermined range from the I axis, wherein the in-phase component I and the quadrature component Q included in the received signal are not matched, the state determining circuit determines that the present domain of the phase points is changed to the next domain according to the rotating direction determined by the rotating direction determining, and wherein the state determining circuit stops observing the quadrant on which the corresponding phase point stays now after the time the state determining circuit continues to observe passes, and outputs the determination result representing the domain on which the corresponding phase point stay, on the basis of the observation result during the observing time after waiting time of waiting the output of the determination result passes.

In the PSK receiver, an quadrant determining circuit stops observing the quadrant where the corresponding phase point on the present point stays after continuously observing time passes, and it outputs the determining result representing the domain the corresponding phase point stays on the basis of the recognized observing result during the observing time after the waiting time to reserve output of the determination result passes. Consequently, the operating stability is guaranteed.

The PSK receiver may further comprise a frequency offset detecting circuit detecting frequency offset of carrier wave, and the state determining circuit may set the observation time and the waiting time matching to the frequency offset value detected in the frequency offset detecting circuit.

In the PSK receiver, since the observing time and the waiting time are set respectively according to the detected-frequency offset values in the frequency offset detecting circuit, it is possible to properly select the necessary observing time and waiting time according to the range of the frequency offset, thereby guaranteeing both the quick determination (demodulation of the received signal) and the accurate demodulation.

In the PSK receiver, the state determining circuit may recognize staying time the corresponding phase point remains on the one domain on the basis of the output of the quadrant determining circuit, set the observation time relatively longer when the corresponding staying time is rather long, and set the observation time relatively shorter when the corresponding staying time is rather short.

In the PSK receiver, according to the time the corresponding phase point stays on one domain, it is possible to properly set the observing time, thereby guaranteeing both the quick determination (demodulation of the received signal) and the accurate demodulation.

In the PSK receiver, the state determining circuit may recognize staying time the corresponding phase point remains on the one domain on the basis of the output of the quadrant determining circuit, sets the waiting time relatively longer when the corresponding staying time is rather long, and sets the waiting time relatively shorter when the corresponding staying time is rather short.

In the PSK receiver, according to the staying time the corresponding phase point stays on one domain, it is possible to properly set the waiting time, thereby guaranteeing both the quick determination (demodulation of the received signal) and the accurate demodulation.

In the PSK receiver, the state determining circuit may recognize staying time the corresponding phase point remains on the one domain on the basis of the output of the quadrant determining circuit, set the waiting time relatively longer when the corresponding staying time is rather long and the observation time as the predetermined initial value, and set the observing time relatively longer and may return the waiting time to the predetermined initial value after the waiting time set longer reaches the predetermined upper limit, and set the waiting time relatively shorter when the corresponding staying time is rather short and the observing time as the predetermined initial value, and set the observing time relatively shorter and returns the waiting time to the predetermined initial value when the waiting time set shorter reaches the predetermined lower limit.

In the PSK receiver, according to the time the corresponding phase point stays on one domain, it is possible to properly set the waiting time and the observing time, thereby guaranteeing both the quick determination (demodulation of the received signal) and the accurate demodulation.

In the communication apparatus, according to the embodiment, the described PSK receiver is provided back on the amplifier that amplifies the received signal by an antenna.

In the communication apparatus, the functions in any PSK receiver are performed in the corresponding communication apparatus.

According to another aspect of the invention, there is provided a PSK receiving method, comprising: extracting an in-phase component I and a quadrature component Q from a received signal on the basis of a carrier wave generated by a carrier waver generator and the received signal; obtaining 1-bit digital signals corresponding to the in-phase component I and the quadrature component Q, by comparing the extracted in-phase component I and the extracted quadrature component Q with a predetermined threshold value; and demodulating the received signal by using a BPSK scheme, on the basis of a position relation on an I-Q constellation of the 1-bit digital signals corresponding to the in-phase component I and the quadrature component Q, respectively.

In the PSK receiving method, since the received signal by using the binary phase-shift keying (BPSK) scheme on the basis of position relation on the I-Q constellation of the 1-bit digital signal corresponding to the in-phase component I and the quadrature component Q is demodulated, demodulation error caused by phase rotation may be reduced. In addition, since it is not necessary to bothersome calculate in order to obtain a phase θ on the basis of the in-phase component I and the quadrature component of the received signal, it is possible to demodulate a phase modulated signal. Consequently, since a multi-bit AD converter or a large-capacity ROM is not necessary, it is possible not to increase the size of the circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a PSK (phase-shifting Keying) receiver and a PSK demodulating circuit relating to an aspect of the present invention are described, referring to the drawings.

Figure 1:
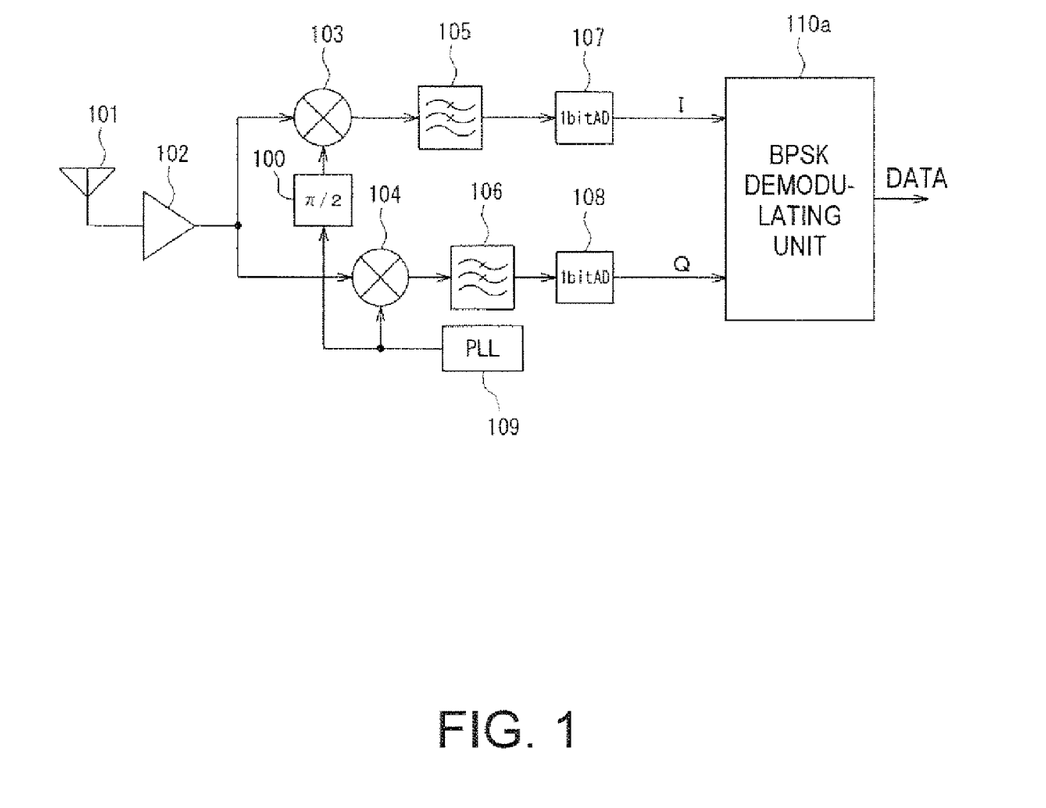
FIG. 1 is a block diagram that illustrates a BPSK receiver relating to an aspect of the invention.

FIG. 1 is a block diagram illustrating a BPSK receiver according to a first embodiment of the invention.

In FIG. 1, a radio receiver includes an antenna 101 that receives quadrature modulated radio wave, a low noise amplifier 102 that receives from the antenna 101 and amplifies a received signal, a PLL circuit 109, a phase shifter 100 that shifts phase of a generated carrier wave in the PLL circuit 109 by π/2, a mixer 103 that extracts an in-phase component I of the received signal by mixing the carrier wave whose phase is shifted by π/2 and a amplified received signal in the low noise amplifier 102, a mix 104 that extracts a quadrature component Q of the received signal by mixing the carrier wave generated in the PLL circuit 109 and the amplified received signal in the low noise amplifier 102, a low-pass filter 105 that eliminates unnecessary high-pass components from the generated signal from the mixer 103, a low-pass filter 106 that eliminates the unnecessary high-pass components from a generated signal from the mixer 104, a 1-bit A/D converter 107 that converts the in-phase component I into an 1-bit digital signal by comparing the in-phase component I where the unnecessary high-pass component is eliminated in the low-pass filter 105 to a predetermined threshold value, a 1-bit A/D converter 108 that converts the in-phase component I into the 1-bit digital signal by comparing the in-phase component I where the unnecessary high-pass component is eliminated in the low-pass filter 106 to the predetermined threshold value, a BPSK (binary phase-shift keying) demodulating unit 110a that demodulates the received signal by using the BPSK scheme on the basis of position relation on an I-Q constellation of the phase point defined by the in-phase component I and the quadrature component Q that are converted into the 1-bit digital signal.

in FIG. 1, the BPSK demodulating unit 110a may demodulate the received signals referring to one of the in-phase component I and the quadrature component Q on the basis of the position relation on the I-Q constellation of the in-phase component I and the quadrature component Q that are converted into the 1-bit digital signal respectively.

That is, the BPSK demodulating unit 110a demodulates the received signal referring only to the in-phase component I when a phase point defined as the in-phase component I and the quadrature component Q that are converted into the 1-bit digital signal are within the predetermined range from I axis, and the BPSK demodulating unit 110a demodulates the received signal referring only to the quadrature component Q when a phase point defined by the in-phase component I and the quadrature component Q that are converted into the 1-bit digital signal are within the predetermined range from Q axis.

The received radio wave in the antenna 101 is amplified to the low noise amplifier 102. The quadrature component Q of the received signal is generated in the mixer 104 by mixing the amplified signal in the low noise amplifier 102 and the generated carrier wave in the PLL circuit 109. In addition, the in-phase component I is generated in the mixer 103 by mixing the amplified received signal in the low noise amplifier 102 and π/2 phase-shifted carrier wave in the phase shifter 100.

In the mixer 103 and 104, each signal of the in-phase component I and quadrature component Q generated is provided to the 1-bit A/D converter 107 and 108, respectively, after the unnecessary high-pass components are eliminated in each low-pass filter 105 and 106.

The in-phase component I and the quadrature component Q that pass the low-pass filter 105 and 106 respectively are converted into the 1-bit digital signal, and then are entered in the BPSK demodulating unit 110a.

The BPSK demodulating unit 110a demodulates the received signals on the basis of the position relation on the I-Q constellation of the in-phase component I and the quadrature component Q that are converted into the 1-bit digital signal.

By performing the description, since it is possible to demodulate the received signal, changing the data determining axis with time properly, it is possible to reduce demodulation error (bit error) caused by phase rotation even though the in-phase component I and the quadrature component Q are converted into the 1-bit digital signal.

Consequently, since bit determination of the received signal is performed, it is unnecessary to perform the bothersome calculation to obtain phase θ from the received in-phase component I and the quadrature component Q. As a result, since a multi-bit AD converter or a large-capacity ROM is not required, it is possible to demodulate phase-modulated signal without increasing the size of the circuit.

Figure 2:
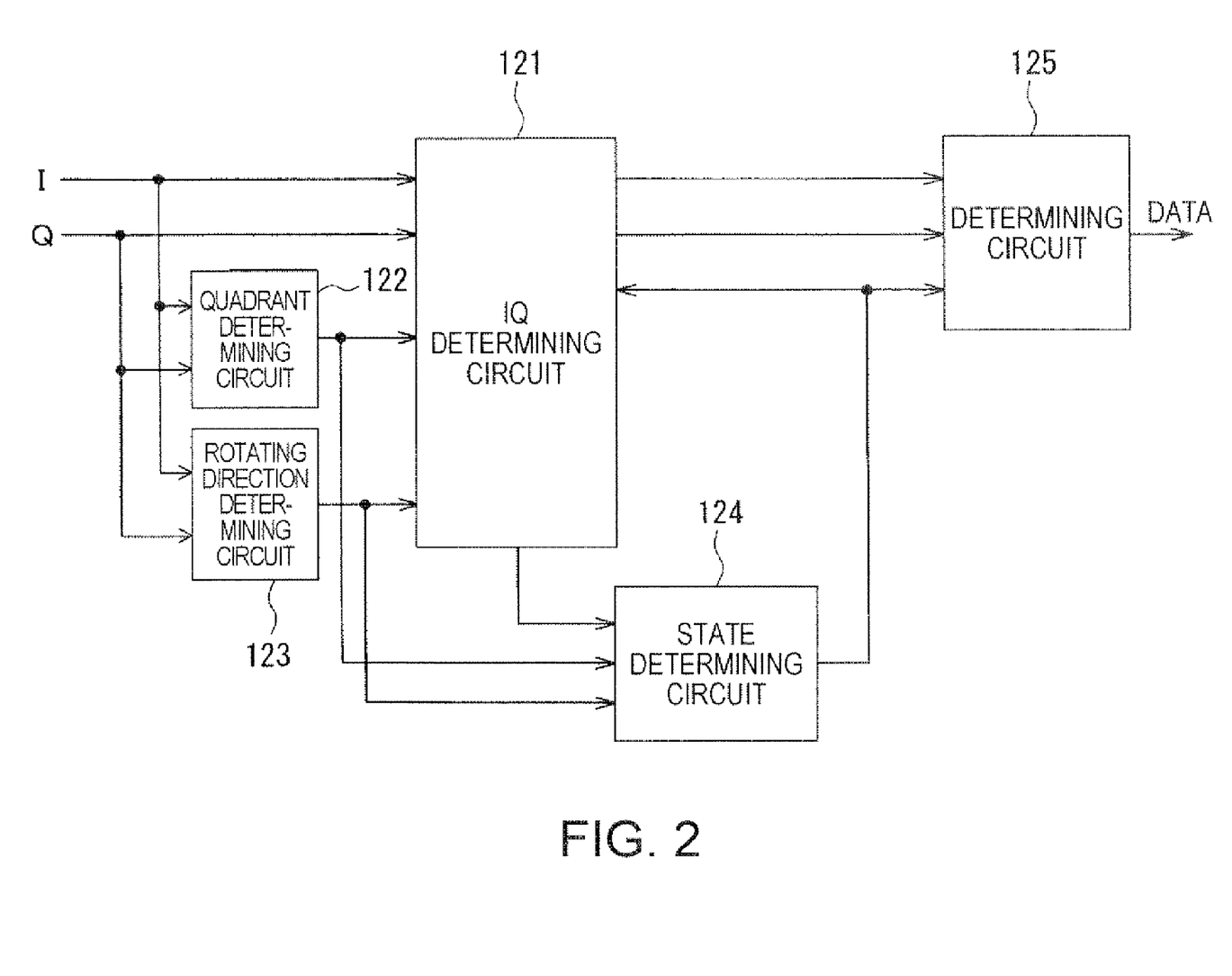
FIG. 2 is a block diagram that illustrates the overall BPSK demodulating unit 110a of the FIG. 1.

FIG. 2 is a block diagram illustrating the overall BPSK demodulating unit 110a of the FIG. 1.

In the FIG. 2, the BPSK demodulating unit 110a includes a quadrant determining circuit 122 that determines which quadrant the in-phase component I and the quadrature component Q included in the received signals belong to, an rotating direction determining circuit 123 that determines rotating direction of a phase point defined by the in-phase component I and the quadrature component Q included in the received signal, an IQ determining circuit 121 that compensates the in-phase component I and the quadrature component Q by determining whether the in-phase component I and the quadrature component Q included in the received signal are right or not on the basis of the determination result in the quadrant determining circuit 122 and the rotating direction determining circuit 123, a state determining circuit 124 that determines position on the I-Q constellation of the phase point defined by the in-phase component I and the quadrature component Q, and a determining circuit 125 that demodulates the transmission signal on the basis of the compensation result in the IQ determining circuit 121 and the determination result in the state determining circuit 124.

Figure 3A:
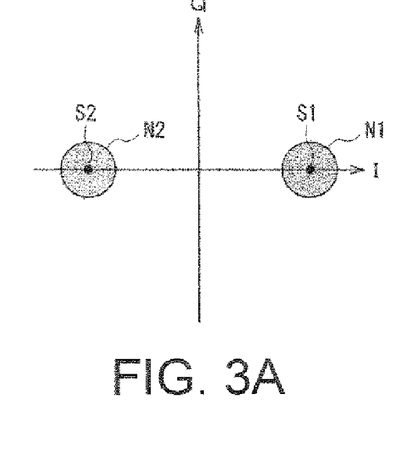
FIGS. 3A and 3B are diagrams illustrating constellation in the BPSK received signal.
Figure 3B:
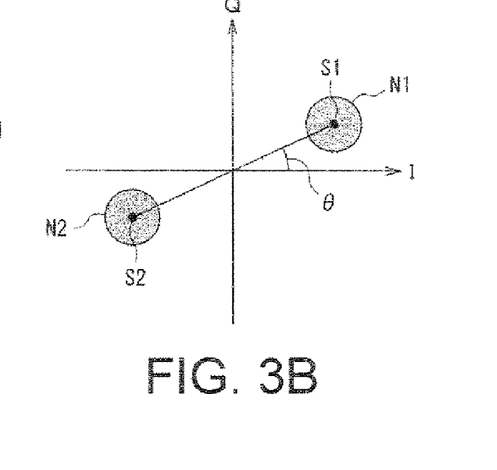

FIGS. 3A and 3B are diagrams illustrating constellation (regarding quadrature modulation, the in-phase component I referring to X axis and the quadrature component Q referring to Y axis) in the BPSK received signal.

In the FIG. 3A, the BPSK transfers binary bit 0 or 1 as 1 symbol, namely 1-bit information by deciding phase shift of the carrier wave as π radian. Here, in the received signal, noises N1 and N2 are added to some domain of surrounding of the ideal phase points s1 and s2.

In addition, in the FIG. 3B, if phase offset exists during the receiving and sending time, the phases s1 and s2 are rotated by phase angle θ. The phase angle θ is changed with time corresponding to frequency offset during the transmission time, and the BPSK phase points s1 and s2 are rotated from the origin.

In the existing calculation, the reverse rotation corresponding to the phase angle θ is performed to compensate the shift of the phase angle θ, namely the rotation of the phase point so that the phase points S1 and s2 actually remain on the same position.

When the calculation is performed by a digital signal, phase error detection is performed by using an NCO (Numeric Controlled Oscillator) to calculate $I'=I*\cos\theta - Q*\sin\theta$, $Q'=Q*\cos\theta + I*\sin\theta$ so that the phases s1 and s2 are compensated on the right phases. In this case, in order to calculate the phase angle θ, it is necessary to calculate the phase point from the signal that the multi-bit AD converter samples a received baseband signal.

In addition, when the in-phase component I and the quadrature component Q are converted into the 1-bit digital signal, some phase points on the 1 quadrant are determined as phase points on the 45°. Therefore, since it is impossible to determine which phase point the signal before quantization exists on, it is impossible to compensate by using the NCO. Instead of compensating the rotation by detecting the phase error in the FIG. 2, demodulating error (bit error) caused by the phase rotation decreases by properly changing data determining axis with time.

That is, in FIG. 2, the in-phase component I and the quadrature component Q that are converted into the 1-bit digital signal in the 1-bit A/D converter 107 and 108 enter into the rotating direction determining circuit 123, the quadrant determining circuit 122, and the IQ determining circuit 121.

The rotating direction determining circuit 123 determines which direction the phase point rotates to from the in-phase component I and the quadrature component Q that are converted into the 1-bit digital signal.

For instance, when a first signal is sent during preamble time and a phase is rotating to left, the phase is changed from a first quadrant to a second quadrant, and it is possible to know the rotating direction of the phase. In addition, if the rotating direction is set in advance by configuring one of sending time and receiving time into higher frequency, it is also possible to determine rotating direction without referring to the received signal.

In addition, the quadrant determining circuit 122 determines which phase the phase point exists on from the in-phase component I and the quadrature component Q that are converted into the 1-bit digital signal. It is possible to determine which quadrant a phase point belongs to as following:

I=1, Q=1⇒the first quadrant,
I=0, Q=1⇒the second quadrant,
I=0, Q=0⇒the third quadrant,
I=1, Q=0⇒the fourth quadrant.

The quadrant determining circuit 122 can determine the present quadrant from a series of a plurality of the in-phase component I and the quadrature component Q. That keeps error signal from changing the quadrant immediately.

As explained above, the rotating direction of the phase point that is determined in the rotating direction determining circuit 123 and the present quadrant of the phase point that is determined in the quadrant determining circuit 122 enter to the IQ determining circuit 121 and the state determining circuit 124.

Suppose that a phase point in the communication starting time is on the first quadrant and the third quadrant, and rotating direction of the phase point is left regarding operation of the IQ determining circuit 121 and the state determining circuit 124.

When the phase offset exists during sending and receiving time, a phase point of the BPSK received signal on the first quadrant and the third quadrant approaches the Q axis rotating left with time. The signals on the first quadrant and the third quadrant means I=Q, but if any noise causes error on either the quadrant, I is not equal to Q.

In the IQ determining circuit 121, when the phase point rotates left and approach the Q axis, probability that sign of the in-phase component I reverses is high. Accordingly, when the I is not equal to the Q, it is determined that the in-phase component I is wrong. In this case, the sign of the in-phase component I reverses, and the in-phase component Q'(=Q) as well as I' (=−1×I) are outputted. In addition, the IQ determining circuit 121 notifies the error signal to the state determining circuit 124.

Referring to the determination result in the IQ determining circuit 121, the state determining circuit 124 estimates position of the present phase point, in consideration of the rotating direction of the phase point determined in the rotating direction determining circuit 123 and the present quadrant of the phase point determined in the quadrant determining circuit 122.

Figure 4:
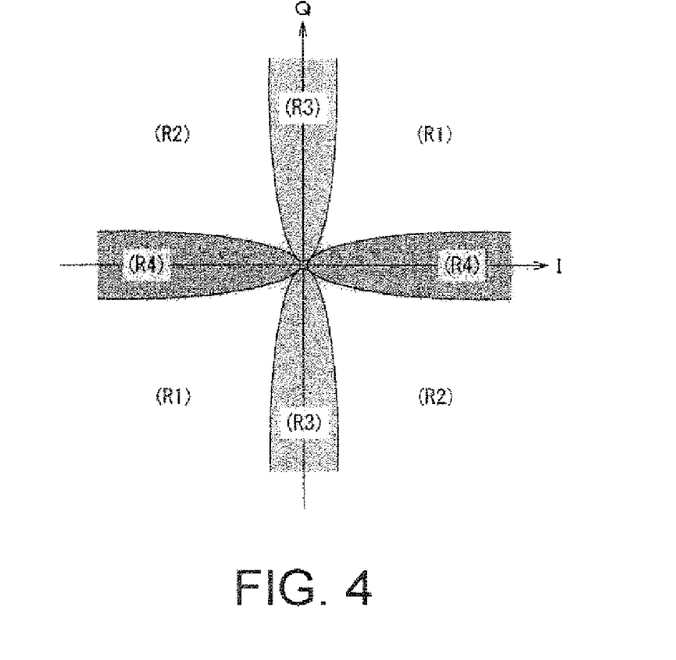
FIG. 4 is a diagram that illustrates state determining domain related to an embodiment of the invention.

FIG. 4 is a diagram that illustrates state determining domain related to the embodiment.

In FIG. 4, in order to estimate position of the present phase point, constellation in the BPSK received signal is divided four domains, R1 to R4. The domain R3 refers to the domain within the predetermined range from the Q axis, the domain R4 refers to the domain within the predetermined range from the I axis, the domain R1 refers to the first quadrant and the third quadrant excluding the domain R3 and R4, and the domain R2 refers to the 2 quadrant and the 4 quadrant excluding the domain R3 and R4.

In addition, in FIG. 1, when a phase point defined as the in-phase component I and the quadrature component Q that are converted into the 1-bit digital signal is within the domain R4 range, the BPSK demodulating unit 110a demodulates the received signal referring only to the in-phase component I, and when a phase point defined as the in-phase component I and the quadrature component Q that are converted into the 1-bit digital signal is within the domain R3 range, the BPSK demodulating unit 110a demodulates the received signal referring only to the quadrature component Q.

That is, when the signal in the quadrant determining circuit 122 in FIG. 2 is stable on the specific quadrant, the state determining circuit 124 determines that the phase point is on the quadrant, and then outputs the signal representing one of the domain R1 or R2 in FIG. 4 to the determining circuit 125. In addition, when a phase point is on the domain R1 or R2 and the IQ determining circuit 121 notifies error, the state determining circuit 124 determines that the phase point is not stable on the domain and determines that the corresponding phase point is shifted to the next domain. That is, in the above instance, since the phase point approaches the Q axis, the state determining circuit 124 determines that the phase point is shifted from the domain R1 to R3 in FIG. 4 and outputs the signal representing the domain R3 to the determining circuit 125.

If the phase point is further rotated, the phase point moves on the domain R2 across the Q axis. At this time, the state determining circuit 124 observes the quadrant result of the quadrant determining circuit 122 during plural of bits (several tens bits) and decides whether the signals representing the second quadrant and the fourth quadrant keep to be outputted stably.

When the state determining circuit 124 determines that the phase point surely moves on the second quadrant and the fourth quadrant, it is meant that the phase point is shifted from the domain R3 to R2. At this time, the state determining circuit 124 outputs the signal representing the domain R2 to the determining circuit 125. The state determining circuit 124 repeats such determination of the domain according to the rotation of the phase point The output signal of the state determining circuit 124 also enters into the IQ determining circuit 121. When the signal representing the domain R3 and R4 from the state determining circuit 124 is outputted. the IQ determining circuit 121 does not compensate the in-phase component I or the quadrature component Q in I≠Q.

Figure 5:
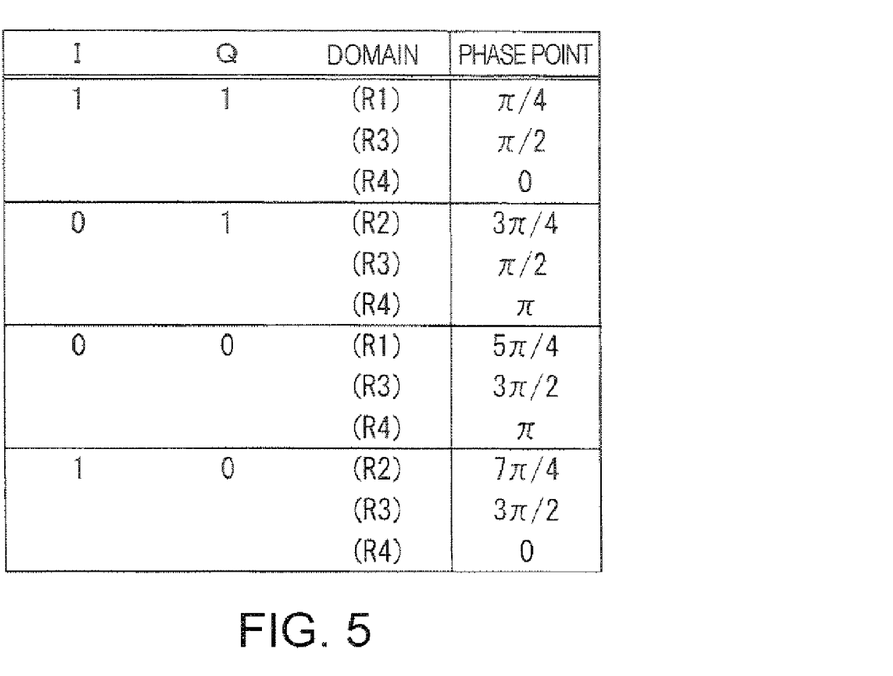
FIG. 5 is a diagram that illustrates a method of determining the phase point related to an embodiment of the invention.

In the case of the DBPSK (Differential BPSK) communication mode, the determining circuit 125 can determines the phase point shown in FIG. 5, on the basis of the I and Q signals in the IQ determining circuit 121 and the domain R1 to R4 in the state determining circuit.

The determining circuit 125 computes phase difference between 2 bits and demodulates data when the phase point is determined. For instance, in the DBPSK, if the phase shift p between 2 bits is π/2<P<3π/2, it is determined that the data are 1 and others are 0. In addition, in the case of π/2 offset DBPSK, it can demodulate as the same way.

Figure 6:
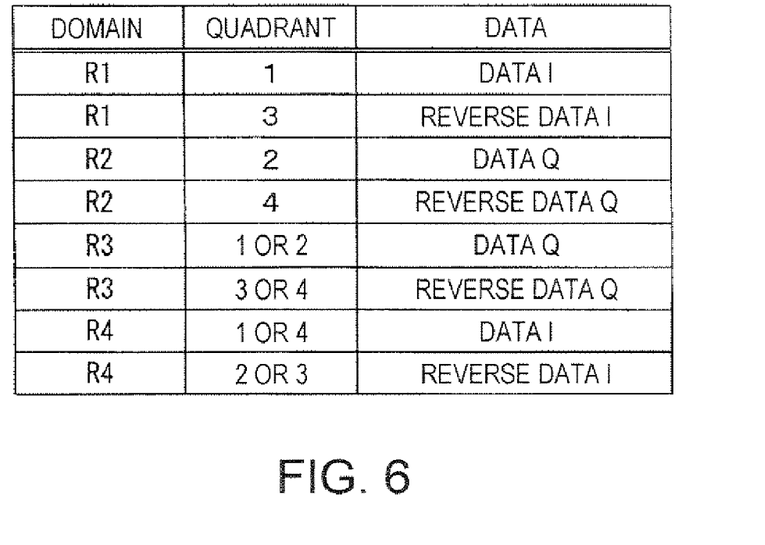
FIG. 6 is a diagram that illustrates a method of determining the phase point-belonging quadrant related to an embodiment of the invention.

In the case of BPSK communication mode, the determining circuit 125 can obtain the output data by determining in FIG. 6. That is, the determining circuit 125 stores the shift of the quadrant from the preamble, and outputs data by determining from relation of the quadrants and domains as shown in FIG. 6.

A method for knowing the shift of the phase point-belonging quadrant estimates the shift of the quadrant on the basis of estimating the domain, from the existing signal, the quadrant of the preamble. For instance, when the quadrant of the preamble is on the first quadrant, it can be determined that the quadrant is on the second quadrant in the time when the domain moves on R1→R→R2.

As described in the above regarding the shift of the phase point-belonging quadrant, since the phase point defined by the in-phase component I and the quadrature component Q moves close to the I axis or the Q axis, it is possible to demodulate the received signal referring to the component where sign is not reversed, thereby reducing bit error, even though the sign of the in-phase component I or the quadrature component Q that is converted into the 1-bit digital signal is very likely to be reversed.

Therefore, even though the phase point is rotated by the frequency offset, the phase point is on high-frequency range or baseband range, and thus it is possible to demodulate the BPSK signal without compensating the frequency. At the same time, since it is possible to demodulate the BPSK signal without using the multi-bit AD converter, the size of the circuit can be reduced.

Figure 7:
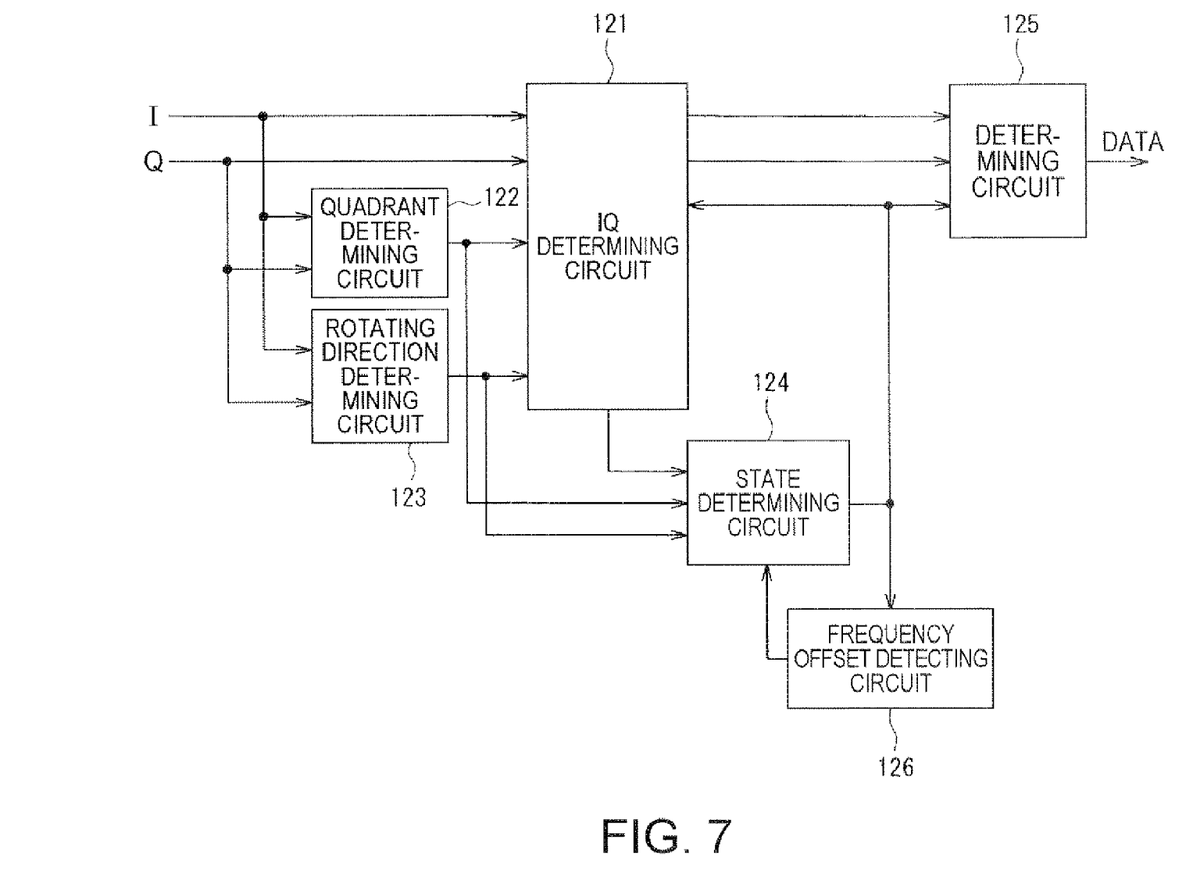
FIG. 7 is a block diagram that illustrates others of the BPSK demodulating unit 110a in FIG. 1.

FIG. 7 is a block diagram that illustrates others of the BPSK demodulating unit 110a in FIG. 1.

In FIG. 7, in addition to FIG. 1, a frequency offset detecting circuit 126 that detects frequency offset of the carrier offset denotes on the basis of time how long it takes the rotating displacement to reach to the predetermined angle corresponding integer times of 90°, when the corresponding phase point rotates on the I-Q constellation with the lapsed time.

The frequency offset detecting circuit 126 receives signal from the state determining circuit 124, determines how long the phase point remains on the domain R1~R4 in FIG. 4, and then estimates the frequency offset between the transmitter and the receiver.

The above speed means how long it takes the rotation displacement to reach to the predetermined angle corresponding integer times of 90° (for instance, 180°, 270°, 360°, 720°, 1080°, etc) when the corresponding phase point rotates on the I-Q constellation with the lapsed time. For instance, it is possible to estimate the frequency offset between the transmitter and the receiver, by measuring how long it takes the domain R1 to be shifted to the domain R3.

The estimated frequency offset in the frequency offset detecting circuit 126 is provided to the state determining circuit 124. When the phase point in FIG. 4 is shifted, for instance "R3⇒R1 or R2" or "R4⇒R1 or R2", in order to decide whether the phase point is on the same quadrant, the time corresponding to the sequent several bits only is used to set that it is necessary to observe the signal.

For instance, t is set to continue to observe during a time corresponding to the sequent 80 bits when it is determined the frequency offset is rather small, and to observe during a time corresponding to the sequent 40 bits when it is determined the frequency offset is rather large.

By applying the above application; since terms of the domain shift can be changed by the frequency offset, it is possible to extend permissible range of the received-enable frequency offset while maintaining a good BER characteristic.

Figure 8:
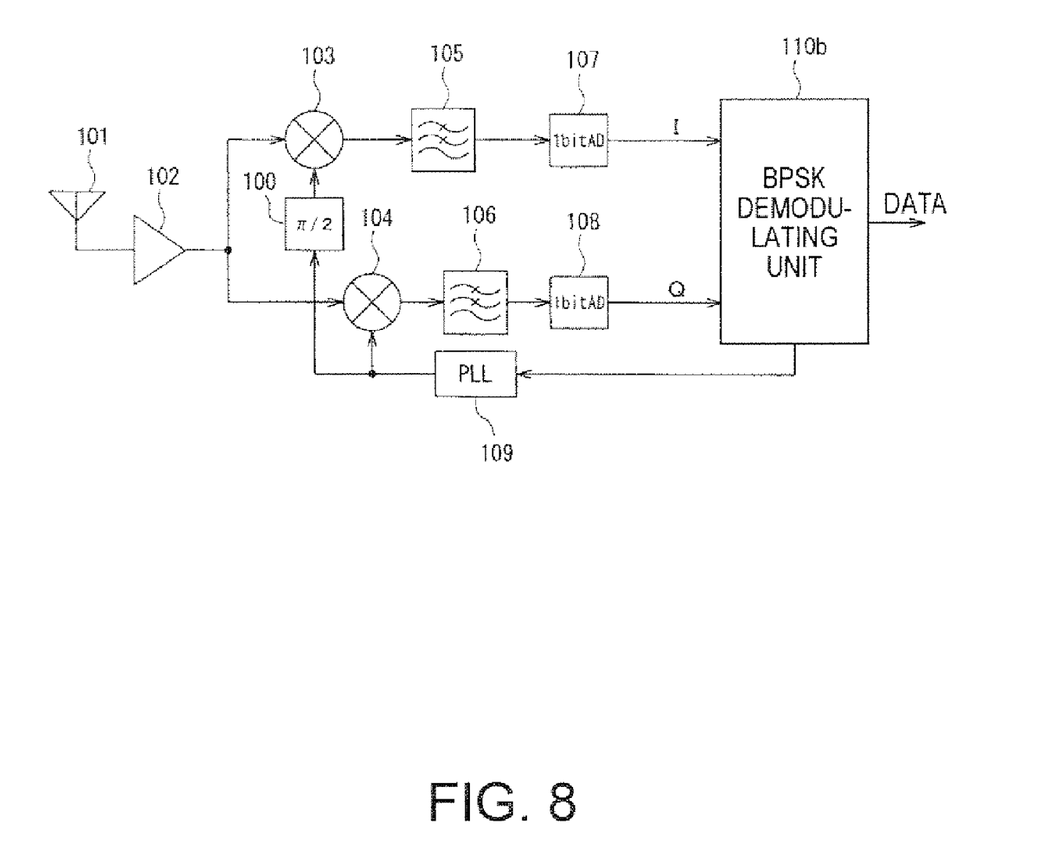
FIG. 8 is a block diagram that illustrates a BPSK receiver related to a second embodiment of the invention.

FIG. 8 is a block diagram that illustrates a BPSK receiver related to a second embodiment of the invention.

In FIG. 8, the BPSK demodulating unit 110b denotes instead of the BPSK demodulating unit 110a. The BPSK demodulating unit 110b can control the generated carrier wave in the PLL circuit 109 on the basis of the frequency offset of the carrier between the transmitter and the receiver.

Figure 9:
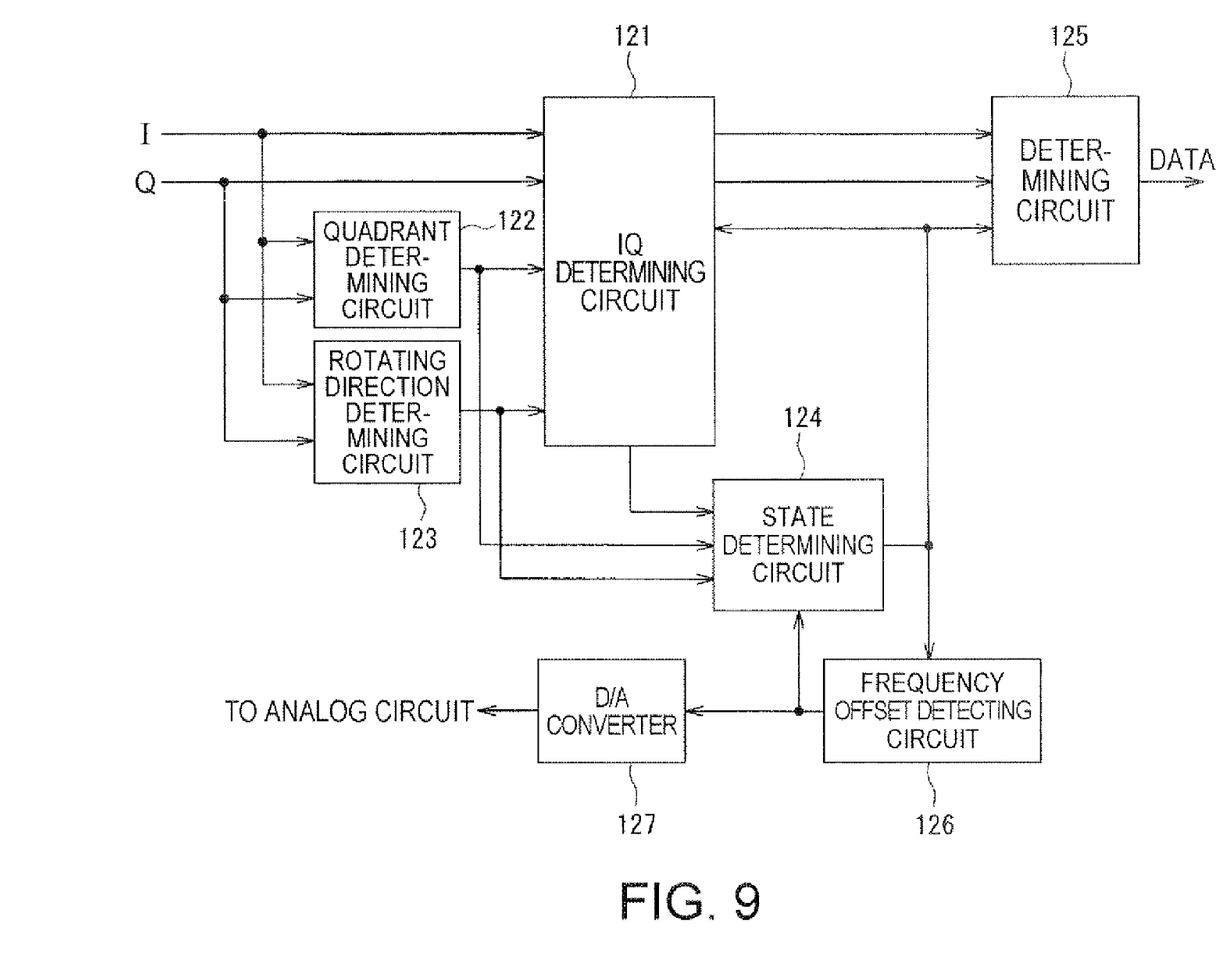
FIG. 9 is a block diagram that illustrates an overall BPSK demodulating 110b in FIG. 8.

FIG. 9 is a block diagram that illustrates an overall BPSK demodulating unit 110b in FIG. 8.

in FIG. 9, a D/A converter 127 is added in FIG. 7. The detected frequency offset in the frequency offset detecting offset 126 is converted into analog signal in the D/A converter 127 and is fed backed to the PLL circuit 109. The PLL circuit 109 controls the carrier frequency on the basis of the frequency offset converted into the analog signal. The feedback of the frequency offset to the PLL circuit 109 enables to gradually decrease the frequency offset between the transmitter and the receiver. Consequently, it is possible to receive at a good BER characteristic, without increasing the size of the circuit.

Figure 10:
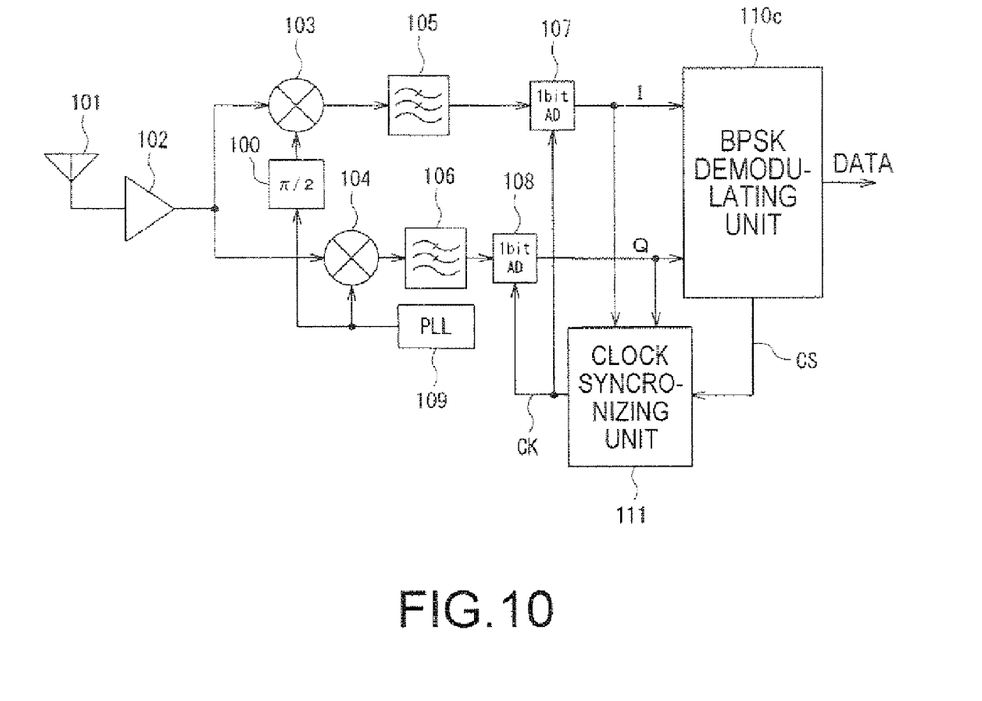
FIG. 10 is a block diagram that illustrates the BPSK receiver related to a third embodiment of the invention.

FIG. 10 is a block diagram that illustrates a BPSK receiver related to a third embodiment of the invention.

Figure 11:
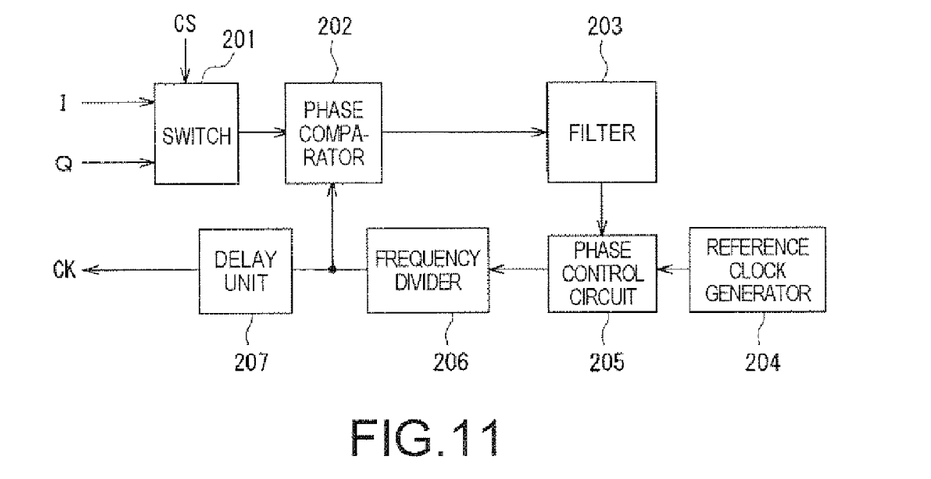
FIG. 11 is a block diagram that illustrates the overall clock synchronization unit 111 in FIG. 10.

FIG. 10 shows a BPSK demodulating unit 110c, instead of the BPSK demodulating unit 110a, and a clock synchronization unit 111 that synchronizes the sampling timing of the 1-bit A/D converter 107 and 108 on the reference clock, according to the comparison result between I signal or Q signal selected on the basis of the determination result in the state determining circuit 124 in FIG. 2 and the output phase in a frequency divider as explained in FIG. 11.

The BPSK demodulating unit 110c enters the signal representing the domains R1 to R4 into the clock synchronization unit 111 as control signal cs, and the clock synchronization 111 controls phase of the reference clock, deciding the I signal or the Q signal according to the control signal cs.

FIG. 11 is a block diagram that illustrates the overall clock synchronization unit 111 in FIG. 10.

In FIG. 11, the clock synchronization 111 has a switch 201 that selects the I signal or the Q signal according to the control signal cs, a phase comparator 202 that compares the outputted I signal or Q signal in the switch 201 and the initiating phase of the outputted-frequency dividing clock in the frequency divider 206 at every 1 cycle so as to output processing signal when the frequency dividing clock starts first and to output delay signal when it starts late, a filter 203 that stabilizes the output signal by preventing noise or jitter contained in the input signal, a reference clock generator 204 that generates the reference clock, a phase control circuit 205 that adjusts phase by adding or eliminating 1 pulse about the reference clock on the basis of the outputted processing signal or the delay signal with intervening the filter 203, a frequency divider 206 that divides the phase-adjusted reference clock, and a delay unit 207 that delays the frequency dividing clock in the frequency divider 206 by $\pi$ and outputs clock ck. Here, the switch 201 selects the Q signal when the control signal cs comes on the domain R3, selects the I signal when the it comes on the domain R4, and selects either signal randomly when it comes on the others.

The I signal or the Q signal selected in the switch 201 enters to the phase comparator 202. The phase comparator 202 compares the outputted I signal or Q signal in the switch 201 and the initiating phase of the outputted frequency-dividing clock in the frequency divider 206 (that is, the reference phase pulse has regular phase relation with the outputted reference clock in the reference clock generator 204) at every 1 cycle, and outputs the processing signal when the frequency clock starts earlier than the I signal or the Q signal and outputs the delay signal when it starts later to the phase control circuit 205 by intervening the filter 203.

The phase control circuit 205 adjusts the phase of the reference clock by adding or eliminating 1 pulse about the reference clock on the basis of the outputted processing signal or the delay signal while intervening the filter 203, and outputs to the frequency divider 206.

The phase-adjusted reference clock in the phase control circuit 205 is divided to the frequency divider 206, is delayed by $\pi$ in the delay unit 207 as clock ck, and then is provided to the 1-bit A/D converter 107 and 108.

Since it is possible to select a signal with larger amplitude as clock synchronizing signal from the in-phase component I or the quadrature component rotated by the frequency offset, the BPSK signal can be demodulated with synchronizing clock in the simple way.

Figure 12:
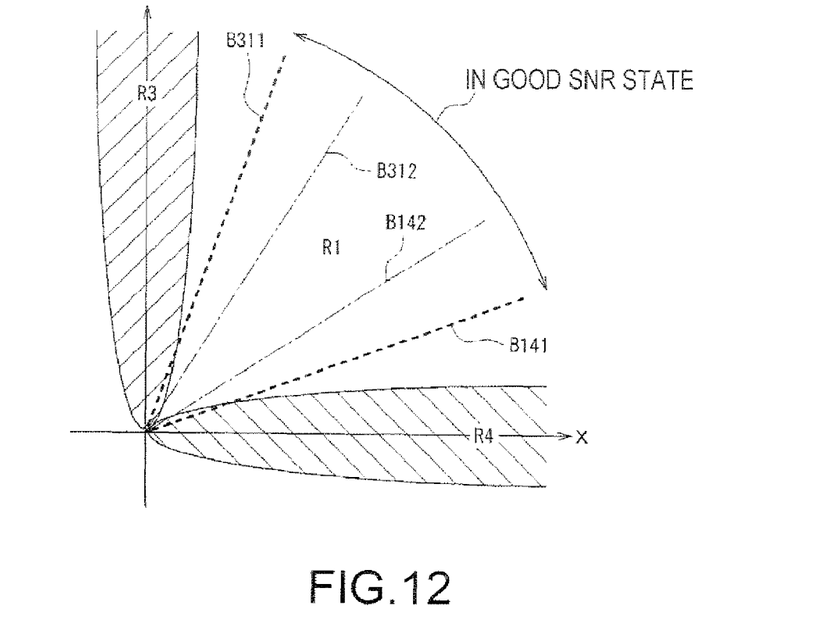
FIG. 12 is a diagram that explains operation of the PSK receiver related to another embodiment of the invention.

FIG. 12 is a diagram that explains operation of the PSK receiver according to another embodiment. Each block diagram according to each embodiment in FIG. 12 is the same as the embodiment explained in FIG. 7.

The state determining circuit 124 recognizes the staying time the corresponding phase point stays on one domain, for example, R1 or R2. Since the staying time is measured as the number of bit in the unit, the waiting time is recognized as Z-bit to explain conveniently.

The state determining circuit 124 does not immediately output the determination result even though the phase point is determined to be on the present domain, and it outputs after the waiting time passes. The waiting time is measured as the number of bit in the unit, but the staying time is recognized as Y-bit to explain conveniently.

The state determining circuit 124 makes the waiting time (Y-bit) longer when the staying time (Z-bit) is longer than the predetermined number of bit. In addition, it makes waiting time (Y-bit) longer when the staying time (Z-bit) is shorter than the predetermined number of bit.

The control operation is explained referring to FIG. 12. When SNR (signal-to-noise ratio) of the received signal is good and position of the phase point exists close to Y-axis, it is possible to determine the phase point is on the domain R1. Consequently, the phase point is shifted from the domain R3 to R1 on the position where the phase point approximately reaches the center of the domain R1 (the near center of the 1 quadrant), that is, the position where the line moves to dashed-line B311.

In contrast, when the SNR is poor, the phase is determined to rotate rather away from Y-axis for a little while. Therefore, the boundary line to determine shift from the domain R3 to the domain R1 is the dashed dotted line B3312 and the near center of the domain R1.

In the time when the phase point is determined to be on either the domain R3 or the domain R1, the analysis of the boundary line (dashed-line B311) in the good SNR and the boundary line (dashed-dotted line B312) in the poor SNR is the same as the analysis of the boundary line (bold dashed line B141) in the good SNR and the boundary line (dashed-dotted line B142) in the poor SNR in the time when the phase point is determined to be on either the domain R1 or the domain R4.

Consequently, in the domain between the boundary B311 and B141 marked as both the bold dashed lines, the phase point on the domain R1 is determined and stays during the explained staying time (Z-bit) in the good SNR.

Similarly, in the domain between both the dashed dotted line B312 and the B142, the phase point on the domain R1 is determined when the SNR is relatively poor.

Generally, if in the good SNR, the phase point is determined to be within the domain R1 during the time the phase point is close to Y-axis, it is unlikely to become wrong. However, if the boundary lines of determining the domain move approximately toward the center of R1, it is more unlikely to become wrong relatively.

Therefore, if the staying time (Z-bit) is larger than the predetermined number of bit, the boundary lines to determine the phase-remaining domain move approximately toward the center of R1, by making the waiting time (Y-bit) larger relatively. If the SNR is poor and the Z is smaller than the predetermined number of bit, the boundary lines move to Y-axis, by making the waiting time (Y-bit) smaller.

By configuring the frequency offset, therefore the proper waiting time (Y-bit) selectively according to the speed of the phase position with the lapsed time, the rapidity and reliability of determination can be compatible.

Figure 13:
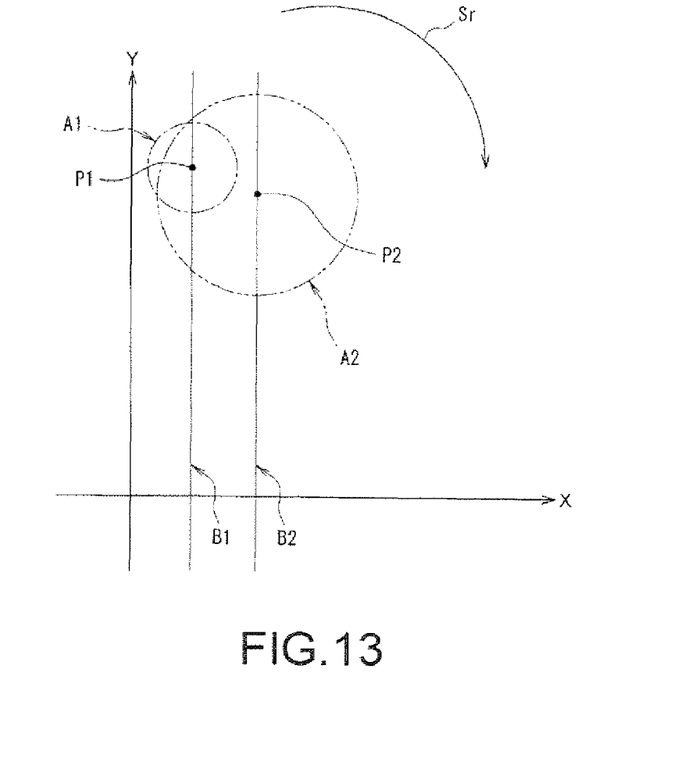
FIG. 13 is a supplementary diagram about FIG. 12.

Referring to FIG. 13, a relation between the SNR quality and a method of setting determining terms in FIG. 12 is explained in further detail.

In FIG. 13, P1 and P2 are ideal phase point themselves, but in this diagram, P1 is a point in good SNR state, and P2 is a point in poor SNR state relatively. A circle A1 surrounding the P1 is a noise domain in relatively good SNR state regarding the P1, while a circle A2 surrounding the P2 is a noise domain in relatively poor SNR state regarding the P2.

When noise extension (A1) is relatively small as in the case of the phase point P1, the phase point can be determined to reach the next domain (seen in a moving direction Sr) before the phase point goes out from a domain B1 which is close to the Y axis where the displacement in the moving direction Sr of the phase point shown by a thin line is small. On the other hand, when noise extension (A2) is relatively large as in the case of the phase point P2, the phase point can be determined to reach eventually the next domain (seen in the moving direction Sr) when the phase point reaches a domain B2 which is far from the Y axis where the displacement in the moving direction Sr of the phase point shown by a thin line is large.

By adjusting the waiting time (Y-bit), it is explained that the boundary lines related to the position of the phase point move, but it is also possible to increase or decrease the observing time (X-bit) the quadrant determining circuit continues to observe the present position of the phase point. The adjustment of the observing time (X-bit) results in moving the boundary lines much larger than the waiting time (Y-bit).

By controlling the observing time (X-bit) and the waiting time (Y-bit), the optimal determining terms are set about the SNR. That is, when the staying time (Z-bit) is longer than the predetermined number of bit, the initial waiting time (Y-bit) is firstly extended while the staying time (Z-bit) is kept at the predetermined initial value. When the waiting time (Y-bit) reaches the predetermined upper limit, the waiting time (Y-bit) is controlled to return to the initial value by extending the observing time (X-bit). In contrast, when the staying time (Z-bit) is shorter than the predetermined number of bit, the initial waiting time (Y-bit) is firstly decreased while the observing time (X-bit) is kept at the predetermined initial value. When the waiting time (Y-bit) reaches the lower limit, the waiting time (Y-bit) is controlled to return to the initial value by decreasing the observing time (X-bit). By repeating the steps, it is possible to control the optimal observing time (X-bit) and the waiting time (Y-bit) about the SNR. A series of these controls are repeatedly performed as necessary.

Implementation of the operation explained with reference to FIG. 12 and FIG. 13 in the respective embodiments is explained below with reference to the block diagram in FIG. 7.

According to one embodiment of the invention, in the state determining circuit 124, when the in-phase component I and the quadrature component Q included in the received signal are not matched, the corresponding phase point on the present domain is determined to be shifted to the next domain according to the rotating direction determined in the rotating direction determining circuit 123. In addition, the quadrant determining 122 stops observing the quadrant where the phase point on the present range remains, after the continuously observing time (X-bit) passes, the quadrant determining 122 outputs the domain where the corresponding phase point exists on the basis of the recognized observing result during the observing time (X-bit), after the waiting time (Y-bit) to suspend output of the determining result passes. It is guaranteed to stabilize the operation by configuring the explained waiting time (Y-bit).

According to another embodiment of the invention, the frequency offset detecting circuit 126 that detects the frequency offset of the carrier wave is additionally provided, and the state determining circuit 124 sets the observing time (X-bit) and the above waiting time (Y-bit) according to the detected frequency offset in the frequency offset detecting circuit 126.

In the embodiment, since it is possible to properly select the observing time (X-bit) and the waiting time (Y-but) needed according to the frequency offset range, the quick determination (demodulation of the received signal) and accurate demodulation can be compatible.

According to other embodiment, the explained state determining circuit 124 recognizes the staying time (Z-bit) the corresponding phase point stays on one domain on the basis of the output in the quadrant determining circuit 122. The state determining circuit 124 sets the observing time (X-bit) rather longer when the corresponding recognized staying time (Z-bit) is relatively long, and it sets the observing time (X-bit) rather shorter when the corresponding recognized staying time (Z-bit) is relatively short. In the embodiment, since the state determining circuit 124 properly sets the observing time (X-bit) according to the staying time (Z-bit) the corresponding phase point stays on one domain, the quick determination (demodulation of the received signal) and accurate demodulation can be compatible.

According to one embodiment of the invention, the aforementioned state determining circuit 124 recognizes the staying time (Z-bit) the corresponding phase point stays on one domain on the basis of the output in the quadrant determining circuit 122. The state determining circuit 124 sets the waiting time (Y-bit) rather longer when the corresponding recognized staying time (Z-bit) is relatively long, and it sets the waiting time (Y-bit) rather shorter when the corresponding recognized staying time (Z-bit) is relatively short. In the embodiment, since the state determining circuit 124 properly sets the waiting time (Y-bit) according to the staying time (Z-bit) the corresponding phase point stays on one domain, the quick determination (demodulation of the received signal) and accurate demodulation can be compatible.

According to another embodiment of the invention, the explained state determining circuit 124 recognizes the staying time (Z-bit) the corresponding phase point stays on one domain on the basis of the output in the quadrant determining circuit 122. The state determining circuit 124 sets the waiting time (Y-bit) rather longer and the observing time (X-bit) to the predetermined initial valve when the corresponding recognized staying time (Z-bit) is relatively long. After the longer-set waiting time (Y-bit) reaches the predetermined upper limit, the state determining circuit 124 sets the observing time (X-bit) relatively longer, and returns the above waiting time (Y-bit) to the predetermined initial value. The state determining circuit 124 sets the waiting time (Y-bit) rather shorter and the observing time (X-bit) to the predetermined initial valve when the corresponding recognized staying time (Z-bit) is relatively short. After the longer-set waiting time (Y-bit) reaches the predetermined lower limit, the state determining circuit 124 sets the observing time (X-bit) relatively shorter, and returns the above waiting time (Y-bit) to the predetermined initial value.

In the embodiment, according to the staying time (Z-bit) the corresponding phase point stays on one domain, it is possible to properly set the waiting time (Y-bit) and the observing time (X-bit), thereby guaranteeing both the quick determination (demodulation of the received signal) and the accurate demodulation.

In the communication apparatus according to one embodiment of the invention, the described PSK receiver is provided back on the amplifier that amplifies the received signal by an antenna. (FIG. 1, FIG. 8, and FIG. 10)

The functions in the described PSK receiver are performed in the corresponding communication system.

As explained above, it is understood that the technical concept is also directed to a method of demodulating the received signal by using the BPSK scheme, wherein the PSK receiver extracts the in-phase component I and the quadrature component Q from the received signal on the basis of the generated carrier wave and the received signals, obtains the 1-bit digital signals corresponding to the in-phase component I and the quadrature component Q respectively by comparing the extracted in-phase component I and quadrature component Q with the predetermined threshold value, demodulates the received signals using a binary phase-shift keying (BPSK) scheme on the basis of position relation on I-Q constellation of the 1-bit digital signals corresponding to the in-phase component I and the quadrature component Q respectively.

In the PSK receiver, since the received signal using a binary phase-shift keying (BPSK) scheme is demodulated on the basis of position relation on I-Q constellation between the 1-bit digital signals corresponding to the in-phase component I and the quadrature component Q, demodulation error caused by phase rotation can be reduced. In additions since it is not necessary to bothersome calculate in order to obtain a phase θ on the basis of the in-phase component I and the quadrature component of the received signal, it is possible to demodulate a phase modulated signal. Consequently, since a multi-bit AD converter or a large-capacity ROM is not necessary, it is possible not to increase the size of the circuit.

The entire disclosure of Japanese Patent Application Nos. 2005-339776, filed Nov. 25, 2005 and 2006-231669, filed Aug. 29, 2006 are expressly incorporated by reference herein.

What is claimed is:

1. A phase-shift keying (PSK) receiver, comprising:
a quadrant determining circuit that determines a quadrant on an I-Q constellation where a phase point defined by 1-bit digital signals respectively corresponding to an in-phase component I and an quadrature component Q included in a received signal exists;
a rotating direction determining circuit that determines rotating direction of the phase point defined by the in-phase component I and the quadrature component Q included in the received signal;
an IQ determining circuit that compensates the in-phase component I and the quadrature component Q by determining whether the in-phase component I and the quadrature component Q included in the received signal are right or not on the basis of the determination result in the quadrant determining circuit and the rotating direction determining circuit;
a state determining circuit that determines position on the I-Q constellation of the phase point; and
a determining circuit that demodulates the received signal on the basis of the compensation result in the IQ determining circuit and the determination result in the state determining circuit,
wherein the state determining circuit divides the I-Q constellation into a first domain including a first quadrant and a third quadrant excluding predetermined range from I axis and Q axis, on a second domain including a second quadrant and a fourth quadrant excluding the predetermined range from the I axis and Q axis, on a third domain including the predetermined range from the Q axis, and on a fourth domain within the predetermined range from the I axis,
wherein the in-phase component I and the quadrature component Q included in the received signal are not matched, the state determining circuit determines that the present domain of the phase points is changed to the next domain along the rotating direction determined by the rotating direction determining circuit, and
wherein the state determining circuit stops observing the quadrant on which the corresponding phase point stays at the moment after the time while the state determining circuit continues to observe passes, and outputs the determination result representing the domain on which the corresponding phase point stay, on the basis of the observation result during the observing time after waiting time of waiting the output of the determination result passes.

2. The PSK receiver according to claim 1, further comprising: a frequency offset detecting circuit detecting a frequency offset of a carrier wave,
wherein the state determining circuit sets the observation time and the waiting time matching to the frequency offset value detected in the frequency offset detecting circuit.

3. The PSK receiver according to claim 1, wherein the state determining circuit recognizes staying time when the corresponding phase point remains on the one domain on the basis of the output of the quadrant determining circuit, sets the observation time relatively longer when the corresponding staying time is rather long, and sets the observation time relatively shorter when the corresponding staying time is rather short.

4. The PSK receiver according to claim 1, wherein the state determining circuit recognizes staying time when the corresponding phase point remains on the one domain on the basis of the output of the quadrant determining circuit, sets the waiting time relatively longer when the corresponding staying time is rather long, and sets the waiting time relatively shorter when the corresponding staying time is rather short.

5. The PSK receiver according to claim 1, which repeats the operation in which the state determining circuit recognizes staying time when the corresponding phase point remains on the one domain on the basis of the output of the quadrant determining circuit, sets the waiting time relatively longer when the corresponding staying time is rather long and the observing time as the predetermined initial value, and sets the observing time relatively longer and returns the waiting time to the predetermined initial value after the waiting time set longer reaches the predetermined upper limit, and sets the waiting time relatively shorter when the corresponding staying time is rather short and the observing time as the predetermined initial value, and sets the observing time relatively shorter and returns the waiting time to the predetermined initial value when the waiting time set shorter reaches the predetermined lower limit.

* * * * *